United States Patent
Kempf

(10) Patent No.: US 8,306,350 B2
(45) Date of Patent: Nov. 6, 2012

(54) ASPECT RATIO DISTORTION MINIMIZATION

(75) Inventor: Jeffrey M. Kempf, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 900 days.

(21) Appl. No.: 12/340,051

(22) Filed: Dec. 19, 2008

(65) Prior Publication Data

US 2010/0158405 A1 Jun. 24, 2010

(51) Int. Cl.
*G06K 9/40* (2006.01)

(52) U.S. Cl. ...................................................... 382/260

(58) Field of Classification Search .............. 345/606, 345/475; 348/E13.065, E7.012, 538, 445, 348/556, E13.016, E5.111, 913, 211.14, E3.018; 358/3.5, 525, 3.23, 448; 375/E7.099, E7.145, 375/E7.253, E7.25, E7.188, E7.248; 382/162, 382/260, 261, 300, 307; 386/271; 396/436; 700/189, 252; 701/28; 704/265; 708/290, 708/313, 847
See application file for complete search history.

(56) References Cited

U.S. PATENT DOCUMENTS

| | | | | |
|---|---|---|---|---|
| 5,363,213 A | * | 11/1994 | Coward et al. | 382/299 |
| 6,229,574 B1 | * | 5/2001 | Han | 348/555 |
| 6,993,464 B2 | * | 1/2006 | Chiu et al. | 703/2 |
| 7,092,035 B1 | * | 8/2006 | Pether | 348/581 |
| 2007/0152990 A1 | * | 7/2007 | Callway | 345/204 |

* cited by examiner

*Primary Examiner* — Gregory F Cunningham
(74) *Attorney, Agent, or Firm* — Warren L. Franz; Wade J. Brady, III; Frederick J. Telecky, Jr.

(57) ABSTRACT

According to one embodiment of the invention, a method is provided for aspect ratio distortion minimization. The method includes receiving input pixels from a video source. The method then determines an input position and scale factor for each input pixel. A count value determines that a pixel should be outputted. A polyphase finite impulse response filter is centered on a particular input pixel based on the count value. An output pixel is generated using the polyphase finite response filter on a particular input pixel based on the count value and output pixels are outputted.

20 Claims, 7 Drawing Sheets

SCALE FACTOR = 0.625, L = 80, M = 128

| | x[0] | x[1] | x[2] | x[3] | x[4] | x[5] | x[6] | x[7] | x[8] |
|---|---|---|---|---|---|---|---|---|---|
| CURRENT COUNT VALUE | 64 | 16 | 96 | 48 | 128 | 80 | 32 | 112 | 64 |
| FUTURE COUNT VALUE | 16 | 96 | 48 | 128 | 80 | 32 | 112 | 64 | 16 |
| STRADDLE OCCURS | NO | YES | NO | YES | YES | NO | YES | NO | NO |
| CURRENT DISTANCE TO OUTPUT | 0 | 48 | N/A | 16 | 64 | N/A | 32 | N/A | 0 |
| FUTURE DISTANCE TO OUTPUT | N/A | 32 | N/A | 64 | 16 | N/A | 48 | N/A | N/A |
| CALCULATE OUT ON CURRENT | YES | NO | YES | YES | NO | YES | YES | NO | YES |
| PHASE TAPS FIR LENGTH = 639 | (159, 239, 319, 399, 479) | N/A | (191, 271, 351, 431, 511) | (143, 223, 303, 383, 463) | N/A | (176, 255, 335, 415, 495) | (127, 207, 287, 367, 447) | N/A | (159, 239, 319, 399, 479) |

| SCALE FACTOR | 1<br>L=128<br>M=128 | .95<br>L=122<br>M=128 | .9<br>L=115<br>M=128 | .85<br>L=109<br>M=128 | .8<br>L=102<br>M=128 | .75<br>L=96<br>M=128 | .7<br>L=90<br>M=128 | .65<br>L=83<br>M=128 |
|---|---|---|---|---|---|---|---|---|
| CURRENT COUNT VALUE | 64 | 64 | 58 | 45 | 26 | 128 | 96 | 58 |
| FUTURE COUNT VALUE | 64 | 58 | 45 | 26 | 128 | 96 | 58 | 13 |
| STRADDLE OCCURS | NO | NO | YES | YES | YES | YES | NO | YES |
| CURRENT DISTANCE TO OUTPUT | 0 | 0 | 6 | 19 | 38 | 64 | N/A | 6 |
| FUTURE DISTANCE TO OUTPUT | N/A | N/A | 109 | 90 | 64 | 32 | N/A | 77 |
| CALCULATE OUT ON CURRENT | YES | YES | YES | YES | YES | NO | YES | YES |
| PHASE TAPS<br>FIR LENGTH = 639 | (63, 191, 319, 447, 575) | (75, 197, 319, 441, 563) | (83, 198, 313, 428, 543) | (82, 191, 300, 409, 518) | (77, 179, 281, 383, 485) | N/A | (171, 261, 351, 441, 631) | (147, 230, 313, 396, 479) |

ASPECT RATIO DISTORTION MINIMIZATION

TECHNICAL FIELD

The present invention relates generally to image processing, and more particularly to aspect ratio distortion minimization.

BACKGROUND

For a long period of time television sets have been designed with a 4:3 aspect ratio. That is, the width of a television set is 4/3 times its height. The 4:3 aspect ratio is often referred to as the standard format. In the United States, these sets are able to receive National Television System Committee (NTSC) signals and the video data encoded in NTSC signals are in the 4:3 aspect ratio. Most of the television shows produced are recorded in a 4:3 aspect ratio.

Movies produced for theater exhibition use a widescreen format. The most common widescreen format utilizes a 16:9 ratio. High definition television sets are often produced in a 16:9 ratio instead of the 4:3 ratio. High definition television signals also carry video data that are in a 16:9 ratio. A number of television shows are now produced using a widescreen format.

These high definition television sets are also capable of displaying standard video. However, because there is extra horizontal space on a television with a 16:9 ratio compared to a 4:3 output, black vertical bars are often added to the left and right of the displayed video. By stretching a 4:3 image horizontally to fully utilize a 16:9 display, the result would often be people and other objects appearing unusually short and stocky.

SUMMARY

According to one embodiment of the invention, a method is provided for aspect ratio distortion minimization. The method includes receiving input pixels from a video source. The method then determines an input position and scale factor for each input pixel. A count value determines that a pixel should be outputted. A polyphase finite impulse response filter is centered on a particular input pixel based on the count value. An output pixel is generated using the polyphase finite response filter on a particular input pixel based on the count value and output pixels are outputted.

According to another embodiment of the present invention, a system for aspect ratio distortion minimization is provided. The system includes a filter operable to receive input pixels from a video source. The filter may also be operable to determine an input position and a scale factor for each input pixel. The filter may determine whether to output an output pixel based on a count value. The filter may center a polyphase finite impulse response filter on a particular input pixel based on the count value. The filter may generate an output pixel using the polyphase finite response filter on a particular input pixel based on the count value and output the output pixel.

While specific advantages have been disclosed hereinabove, it will be understood that various embodiments may include all, some, or none of the disclosed advantages. Additionally, other technical advantages not specifically cited may become apparent to one of ordinary skill in the art following review of the ensuing drawings and their associated detailed description.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF EXAMPLE EMBODIMENTS

A particular issue in the transition from common 4:3 "standard" aspect ratio displays into 16:9 "widescreen" aspect ratio displays is how to process the image data. Standard interpolation techniques to stretch the image often result in objects appearing shorter and wider than originally filmed. A solution to this issue is to minimize the distortion in the middle of an image, where most of the meaningful image content is likely to be located and allow additional distortion toward the edges of the image.

However, in order to accommodate a wide range of scale factors, for example 1.1:1 near the middle of the image and as much as 2:1 or greater at the edges, current techniques require the use of a filter for each contemplated scale factor. These filters often add to the cost of manufacture and are rarely suitable for use in other parts of the manufactured system. A microprocessor may be used to generate each scale factor, but create similar issues that make the use of many separate filters and make this technique undesirable. What is needed is a technique for minimizing aspect ratio distortion that can be implemented with minimal use of filters and microprocessors.

Figure 1:
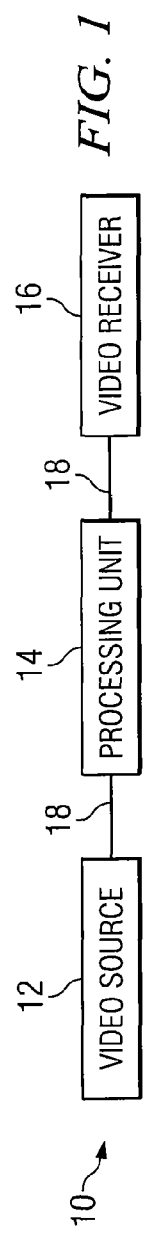
FIG. 1 is a block diagram illustrating an example system for aspect ratio distortion minimization.

FIG. 1 is a block diagram illustrating an example system 10 for aspect ratio distortion minimization. In the illustrated example, system 10 includes a video source 12, processing unit 14, and video receiver 16. These components may be connected via links 18.

In particular embodiments, video source 12 may be components, systems, and/or network elements that provide video data. Although generally referred to in the singular, any number of suitable components, systems, and/or network elements may be considered video source 12. These include, video cassette recorders (VCRs), digital versatile disk (DVD) players, cable and/or satellite boxes, digital or analog cameras, camcorders, or other video recording devices, web cameras (webcams), computers, laptops, projection systems, or any other device that is capable of transmitting video data.

Processing unit 14 may include one or more electronic computing devices operable to receive and process video data. For example, processing unit 14 may include one or more PCs, workstations, Unix-based computers, server computers, a server pool, or any other suitable devices. Additionally, processing unit 14 may be part of or an applicant specific integrated circuit (ASIC). Further, processing unit 14 may include any suitable combination of software, firmware, hardware, and any other suitable components.

Processing unit 14 may include an interpolator/decimator. Interpolator/decimator may be used to scale an input line. For example, increasing the sample rate by an integer factor, L, may be accomplished by expansion followed by low-pass filtering. Expansion consists of entering L−1 zeros between samples of the input sequence. To construct the final output sequence and prevent imaging, the expanded sequence may be passed through a low-pass filter with cutoff frequency $\pi/L$ and gain L.

Reducing the sample rate by an integer factor, M, may be achieved by low-pass filtering followed by compression. In order to prevent aliasing, the cutoff frequency of the low-pass filter could be set to $\pi/M$. Subsequently, compression is achieved by sampling the filtered sequence, x[n], with period M. This produces the output sequence x[nM].

These two operations, interpolation and decimation, may be combined to change the sample rate by a non-integer factor. By choosing L and M appropriately, any output resolution can be produced for a given input resolution. If M>L the resolution decreases, and if M<L, the opposite is true. Additionally, the output resolution may vary locally by altering M and L with input position. A look-up table (LUT) may be used to determine the M (or L) value based on input position.

In particular embodiments, to eliminate the need for a tunable low-pass filter, the minimum of $\pi/L$ and $\pi/M$ may be fixed, which may also be the cutoff frequency of the low-pass filter. In particular, limiting the maximum of L and M to 128 provides certain advantages such as the ability to use bit shift calculations. Further, by setting the cutoff frequency to a reasonably small value ($\pi/128$), approximation error may be limited to a non-perceptible level.

In particular embodiments, the properties of expansion and compression on either side of the low-pass filter can be exploited to reduce the complexity of a finite impulse response (FIR) filter implementation. It should be noted that only every $L^{th}$ input sample into the low-pass filter is nonzero. Consequently, for a given input sample, only a limited number of filter taps contribute to the final filtered result. Additionally, compression eliminates several filtered results; only every $M^{th}$ output sample is retained. A FIR filter implementation that exploits these properties is referred to as a polyphase filter.

A particular advantage of this embodiment is the number of multiplies per output is reduced with the polyphase filter implementation. The inserted zeros in the expanded sequence are ignored, and a decimated filter is used on the original input sequence. Each decimated filter is referred to as a "phase" within the original FIR filter, hence the name "polyphase filter".

The polyphase filter implementation not only reduces the amount of multiplies per output but also decreases the filter clock speed. This is due to the fact that the polyphase filter produces only retained output values. A non-polyphase filter operates on the expanded input and output pixel grids. If the input image were from an SVGA, 60 Hz refresh rate source, the input pixel clock would be equal to 40 MHz, and the non-polyphase filter would operate at 2*40 MHz=80 MHz. Comparatively, the polyphase filter would operate at the desired output rate=0.75*input rate=0.75*40 MHz=30 MHz.

Even though a polyphase filter does not explicitly perform the expansion and compression functions, the relative position between the expanded input and output pixel grids must be known. This information is needed to determine when to produce an output value and the corresponding filter phase required to generate this output value. This position information is derived from the current input pixel count and corresponding scale factor. Determination of the position information is discussed in further detail with the counting methods in FIGS. 3a, 3b, 4a, 4b, 5a, and 5b.

Video receiver 16 may be any component capable of receiving and displaying video data. For example, video receiver 16 may include standard definition and high definition televisions, computer monitors, camcorders, digital and analog video recorders, projectors, or any other suitable device. Video receiver 16 may be of fixed resolution or capable of receiving differing resolutions. For example, a high definition television may be capable of receiving video signals at 480p, 720i, 720p, 1080i, and 1080p resolutions.

In particular embodiments, video source 12, processing unit 14, and video receiver 16 may be coupled to each other via links 18. Links 18 facilitate wireless or wire-line transfer of video data. Links 22 may transfer video data using, for example, IP packets, Frame Relay frames, Asynchronous Transfer Mode (ATM) cells, voice, video, data, and other suitable information between network addresses. Links 22 may include one or more local area networks (LANs), radio access networks (RANs), metropolitan area networks (MANs), wide area networks (WANs), all or a portion of the global computer network known as the Internet, and/or any other communication system or systems at one or more locations. Additionally, links 22 may include Radio Corporation of America (RCA) audio/video (A/V), S-video, coaxial, high definition multimedia interface (HDMI), component video (YPbPr), red, green, blue (RGB), digital video interface (DVI), or other suitable connectors.

In operation of system 10, a video signal may be sent from video source 12. Processing unit 14 may process the video signal according to scale factors from a look-up table or other rules. The video signal may be filtered by a finite impulse response filter. Output pixels may be generated and outputted to video receiver 16.

Although this particular implementation of system 10 is illustrated and primarily described, the present invention contemplates any suitable implementation of system 10 according to particular needs including any suitable combination of software, firmware, hardware, and any other suitable components. Additionally, although described separately, the functions and/or structure of the components of system 10 may be combined or separated in any suitable manner, according to particular needs.

Figure 2:
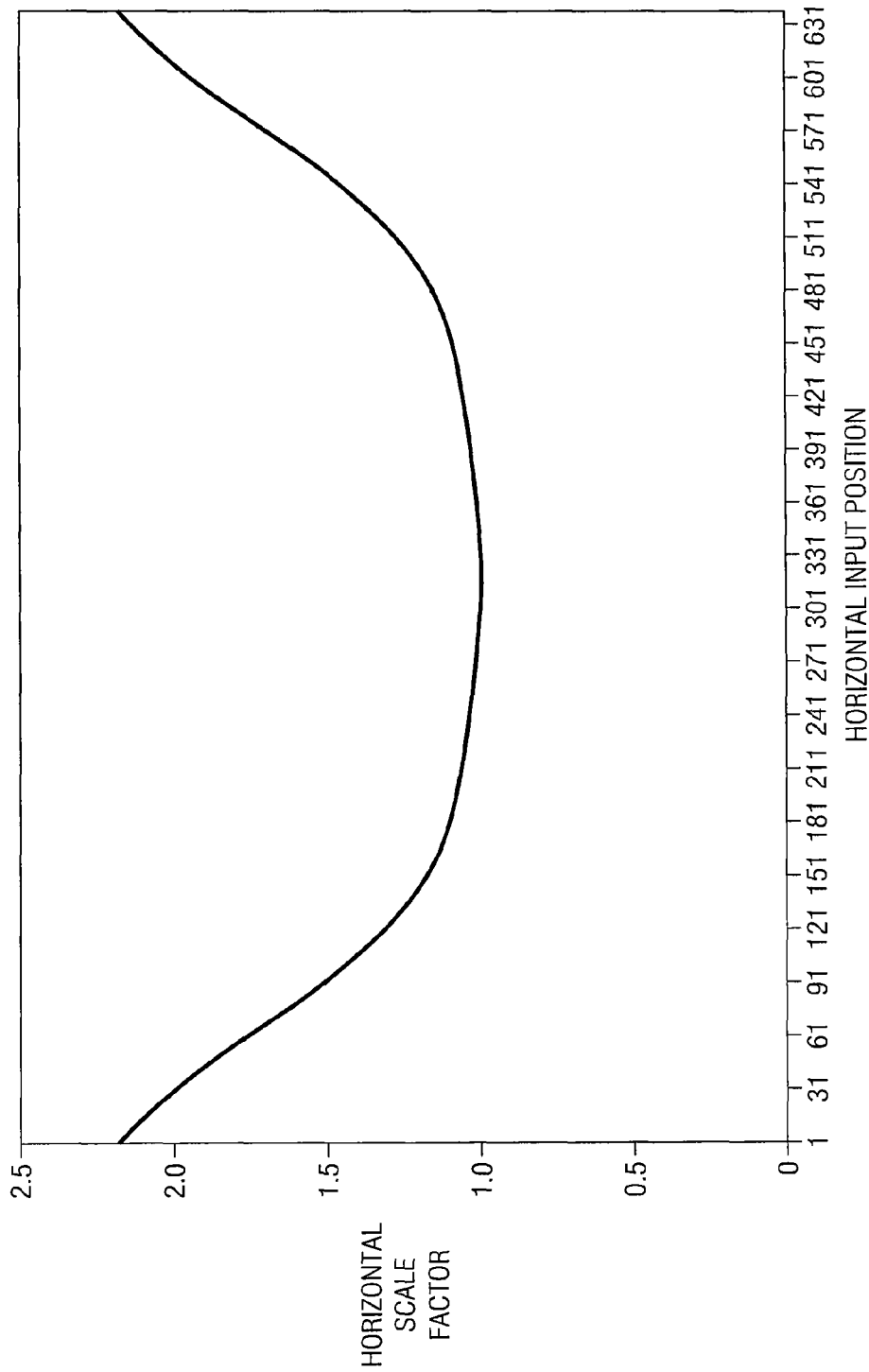
FIG. 2 is a graph illustrating an example of scale factor versus input position for aspect ratio distortion minimization.
Figure 3A:
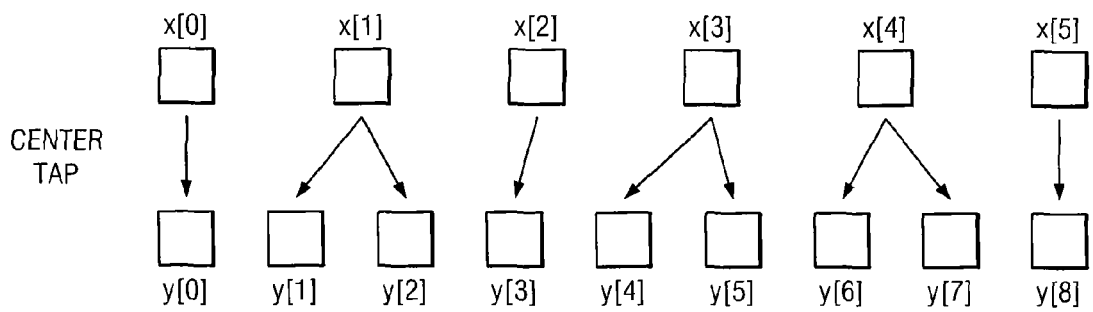
FIGS. 3A and 3B illustrate counting schemes for aspect ratio distortion minimization in interpolation.
Figure 3B:
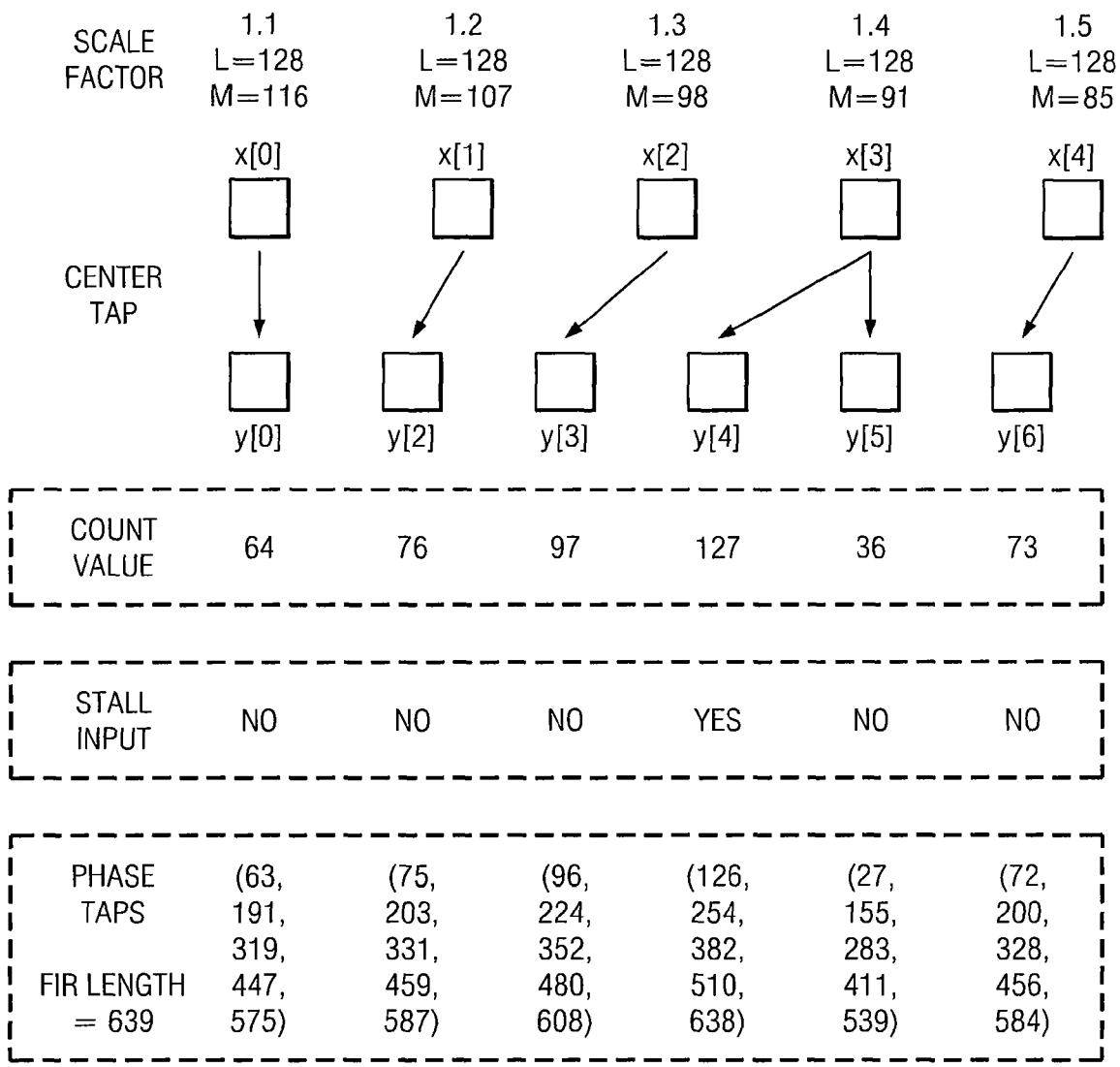
Figure 4A:
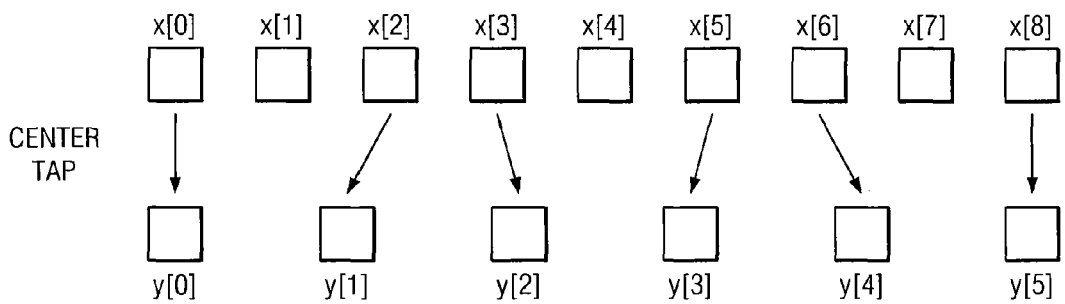
FIGS. 4A and 4B illustrate counting schemes for aspect ratio distortion minimization in decimation.
Figure 4B:
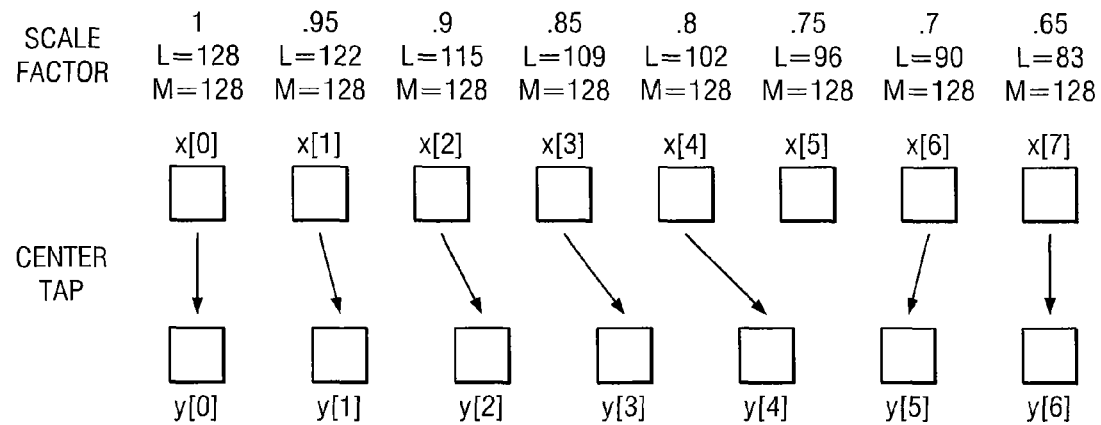
Figure 5A:
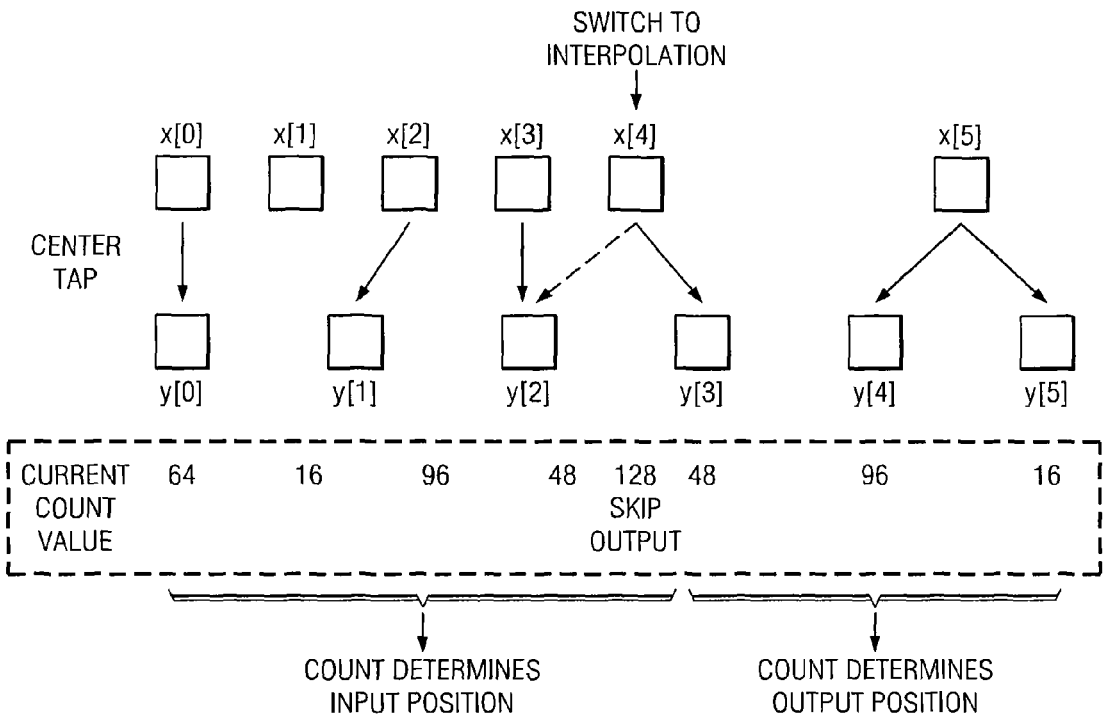
FIGS. 5a and 5b illustrate example counting schemes for aspect ratio distortion minimization when using both interpolation and decimation in an input line.
Figure 5B:
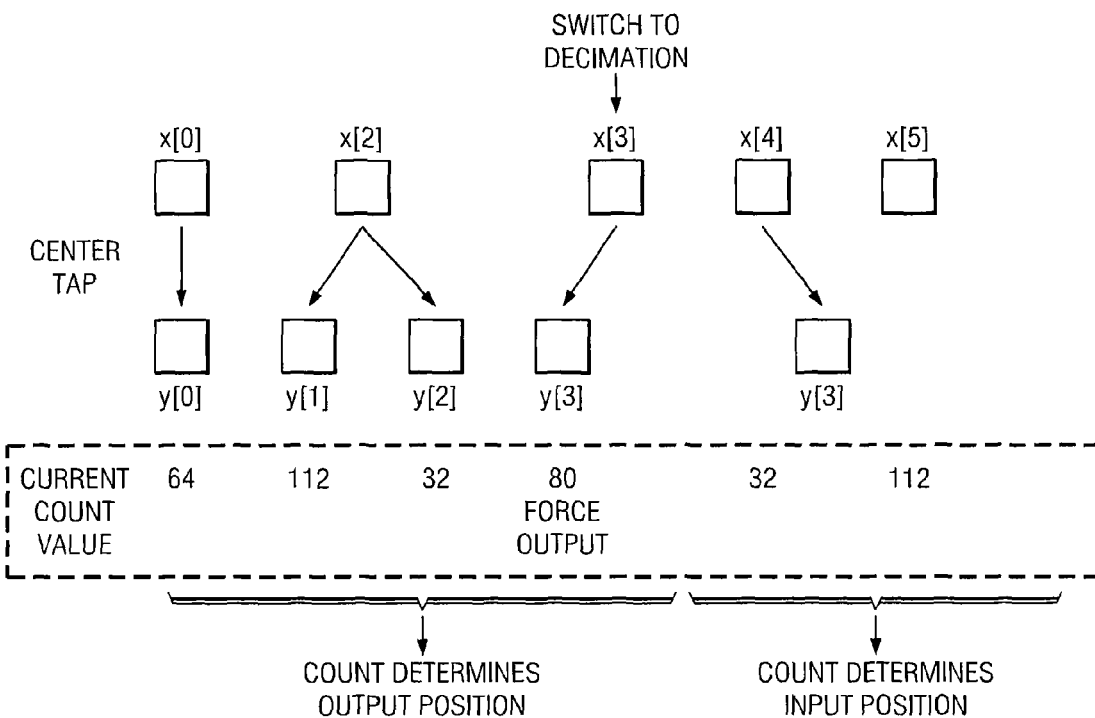
Figure 6:
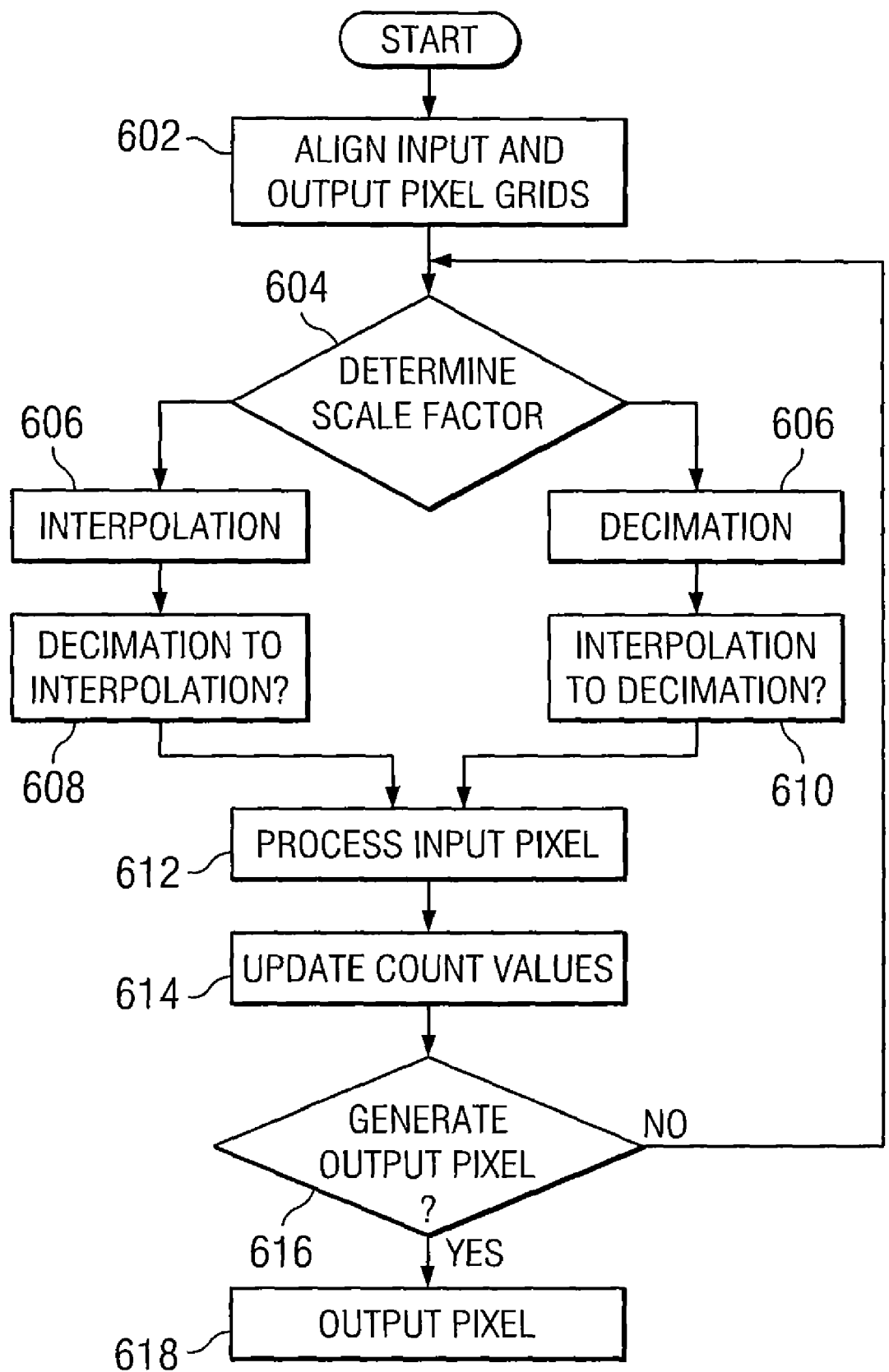
FIG. 6 is a flowchart illustrating an example method for aspect ratio distortion minimization.

As can be understood with respect to system 10, an embodiment of the invention provides a system for aspect ratio distortion minimization. The following figures may provide greater insight to those of ordinary skill in the art as to other embodiments of the invention. FIG. 2 is a graph illustrating an example of scale factor versus input position for aspect ratio distortion minimization. This example illustrates an embodiment for transitioning from a 640×480, 4:3 image, to a 854×480, 16:9 image, to minimize aspect ratio distortion. FIGS. 3A and 3B illustrate counting schemes for aspect ratio distortion minimization in interpolation. FIGS. 4A and 4B illustrate counting schemes for aspect ratio distortion minimization in decimation. FIGS. 5a and 5b illustrate example counting schemes for aspect ratio distortion minimization when using both interpolation and decimation in an input line. FIG. 6 is a flowchart illustrating an example method for aspect ratio distortion minimization.

FIG. 2 is a graph illustrating an example of scale factor versus input position for aspect ratio distortion minimization. In particular embodiments, system 10 utilizes a position dependent scale factor approach to minimize the aspect ratio distortion in the center of the screen, where the most meaningful image content is located. In other words, the original aspect ratio is maintained in the center of the output image and the majority of the distortion is placed towards the horizontal edges of the image. The graph below illustrates one particular example. The input source is a 640 pixels wide, 4:3 material. The fixed resolution device is an 854 pixels wide, 16:9 display. This graph shows that the horizontal rate of change is most severe at the edges of the image and the input aspect ratio is maintained at the center of the output image, where the scale factor is unity. It is also important to note that the integral of this function is equal to the output resolution, 854 pixels.

FIGS. 3A and 3B illustrate counting schemes for aspect ratio distortion minimization in interpolation. FIG. 3A illustrates a simple example for interpolation using a constant scale factor. The constant scale factor in this example is 1.6. The scale factor allows for derivation of the parameter M. When interpolating the factor L is held to be a constant, preferably 128, although any number may be used. The use of numbers that are 2^n permits the use of binary shifting, which may be easy to implement. The value of L/M is equal to the desired scale factor. In this example, M is equal to 80. These parameters are used in conjunction with several other counters/trackers.

These other counter/trackers include an input position tracker, an output position tracker, and a count value. The input position is denoted by x[A], where A is a number representing the numerical position of the pixel in relation to the beginning of each input line. The output position is denoted by y[B], where B is a number representing the numerical position of the pixel in relation to the beginning of each output line. For these two position counters/trackers, any initial number or increment may be used when moving from pixel to pixel, however, in described embodiments, these counters/trackers begin at zero at the beginning of an input line and increment by 1. Filtering of the input pixel to create an output pixel may be performed. For convenience, the input or output pixel and its position may be used interchangeably throughout this specification. A scale factor may be obtained for each input pixel according to the resizing function desired. In this example, the interpolation function is a constant 1.6.

A count value is also initialized. The count value may be derived by forcing the first input pixel to align with the first output pixel. Alternatively an offset could be used. It may be helpful to visualize the input and output lines as being on two separate grids. The input line grid contains the input pixels. These pixels are spaced a constant distance apart, or L units apart. The output grid has pixels spaced an effective M units apart. In the illustrated example, the output grid has pixels spaced 80 units apart. In embodiments where the scale factor, and thus M varies, an effective M could be calculated. However, the output grid will not spatially align with the input grid except at certain count values. Generically, the alignment count may be calculated by as follows. Take the maximum of the L or M value. Divide that value by 2. This may be expressed as max(L,M)/2. For example, where L is 128 and M is 80, the input and output grids align when the count value is equal to 64. Thus, the alignment count is equal to 64 in this example.

Stalls, or occasions when the input pixel counter is not incremented, may occur. In interpolation, extra output pixels are generated from the input pixels. The locations where these extra output pixels are inserted into the output grid are determined by the count value. The count value is utilized to determine these points as well as determining the filter taps to be used in the filtering of the input pixels to generate the output pixels.

After each output pixel is generated, the count value is decremented by the M value when interpolating. This may cause the count value to become less than one. In such an event, the count value is rolled under by the L value. However, in certain circumstances, the count value may remain positive after decrementing. In such a circumstance, the input pixel counter is not incremented or stalled. A second output pixel may be generated from the same input pixel. This process will be described in further detail as part of the illustrated example.

In the illustrated example, at the beginning of a line the output and input grids are forced to be spatially aligned using the count value. Thus, in the illustrated example, an initial count value of 64 is assigned. The polyphase filter is centered on pixel x[0] and produces output pixel y[0]. The count value is decremented by M, in this example, 80, leading to a count value of −16. This value is less than one so no stall occurs. The input and output pixel counters are incremented by 1. The count is then rolled under to 112 (−16+128). The polyphase filter is centered on pixel x[1] and creates output pixel y[1]. The count is decremented by M to reach a count value of 32. Because the count value has not become less than 1, a stall occurs and only the output pixel counter is incremented by 1. Output pixel y[2] is generated by using a different phase of the filter, centered on pixel x[1]. The count is decremented by M. This results in a count value of −48. This is less than one so the stall is cleared and the input and output pixel counters are incremented by 1. The count value is rolled under to 80 (−48+128). The polyphase filter is centered on pixel x[2] and creates output pixel y[3]. The count value is decremented by M, resulting in a count value of exactly 0. Since the count value is less than 1, no stall occurs, and the count value is rolled under to 128 (0+128). Both the input and output pixel counters are incremented by 1.

The polyphase filter is centered on pixel x[3] and creates output pixel y[4]. The count value is decremented by M, resulting in a count value of 48. This value is greater than zero and causes a stall to occur. Only the output pixel counter is incremented by 1. Output pixel y[5] is generated by using a different phase of the filter, centered on pixel x[3]. The count value is decremented by M. This results in a count value of −32. This is less than one so the stall is cleared and the input and output pixel counters are incremented by 1. The count value is rolled under to 96 (−32+128). The polyphase filter is centered on pixel x[4] and creates output pixel y[6]. The count value is decremented by M, resulting in a count value of 16. This value is greater than zero and causes a stall to occur. Only the output pixel counter is incremented by 1. Output pixel y[7] is generated by using a different phase of the filter, centered on pixel x[4]. The count value is decremented by M. This results in a count value of −64. This is less than one so the stall is cleared and the input and output pixel counters are incremented by 1. The count value is rolled under to 64 (−64+128). This method continues until all the input pixels in the line are processed. Additional lines may be processed similarly.

FIG. 3b illustrates the counting scheme as applied to a changing array of scale factors. In this example, each input pixel is interpolated by a different scale factor. Similar to the example above, at the beginning of each line, the count value is initialized such that the grids for the input and output pixels are aligned. Thus, L is held constant at 128 and therefore the count value is initialized to 64. However, instead of using a constant scale factor, and thus constant M, the scale factor varies according to the input pixel.

In this example, a scale factor for each input pixel may be obtained from a look-up table. For example, a look-up table may specify the scale factor for each input pixel in a display line in a 480p display in order to convert the image for use on a 720p display. Regardless of how the scale factor is determined for each pixel, each input pixel may have an associated scale factor. In the illustrated example, input pixel x[0] has an associated scale factor of 1.1. The scale factor corresponds to an M value of 128/1.1=116. The polyphase filter is centered on pixel x[0] and creates output pixel y[0]. The count value is decremented by M resulting in a count value of −52. This value is less than one so the input and output pixel counters are incremented by 1. The count value is rolled under to 76 (−52+128). Input pixel x[1] has an associated scale factor of 1.2, which corresponds to an M value of 128/1.2=107. The polyphase filter is centered on pixel x[1] and creates output pixel y[1]. The count value is decremented by M resulting in a count value of −31. This value is less than one so the input and output pixel counters are incremented by 1. The count value is rolled under to 97 (−31+128). Input pixel x[2] has an associated scale factor of 1.3, which corresponds to an M value of 128/1.3=98. The polyphase filter is centered on pixel x[2] and creates output pixel y[2]. The count value is decremented by M resulting in a count value of −1. This value is less than one so the input and output pixel counters are incremented by 1. The count value is rolled under to 127 (−1+128).

Input pixel x[3] has an associated scale factor of 1.4, which corresponds to an M value of 128/1.4=91. The polyphase filter is centered on pixel x[3] and creates output pixel y[3]. The count value is decremented by M resulting in a count value of 36. Because the count value has not become less than one, a stall occurs and only the output pixel counter is incremented by 1. Thus, output pixel y[5] is generated by using a different phase of the filter, centered on pixel x[3]. The count is decremented by M. This results in a count value of −55. This is less than one so the stall is cleared and the input and output pixel counters are incremented by 1. The count value is rolled under to 73 (−55+128). Input pixel x[4] has an associated scale factor of 1.5, which corresponds to an M value of 128/1.5=85. The polyphase filter is centered on pixel x[4] and creates output pixel y[6]. The count value is decremented by M resulting in a count value of −12. This method continues until all the input pixels in the line are processed. Additional lines my may be processed similarly.

FIGS. 4A and 4B illustrate counting schemes for aspect ratio distortion minimization in decimation. FIG. 4A illustrates a simple example for decimation using a constant scale factor. In decimation, the number of output pixels is reduced. In the illustrated example, it is desired to reduce the input image by 5/8 or 0.625. Decimation may utilize the same two parameters L and M. However, unlike in interpolation, M is held constant, again preferably at 128, although any number may be used. The use of numbers that are 2^n permits the use of binary shifting, which may be easy to implement. However, in order to achieve a scale factor that's less than 1, L must be less than M.

Additionally, decimation may use current and future count value counters. The current count value counter is similar to the count value counter described with respect to interpolation. However, in decimation, L is added to the current count value and the count rolls over to the count minus the M value for values greater than M. The current count value counter keeps track of the current count value. The future count value counter "looks ahead" by calculating the next current count value. A rollover at a pixel occurs when the future count value is rolled over. The current and future count value may be used to determine a current distance to output and a future distance to output for use in determining which input pixel to use to create a new output pixel.

In decimation, the concept of a straddle, as opposed to a stall, is introduced. A straddle occurs when two input pixels lie on either side of an output pixel. When a straddle occurs, a determination is made as to which input pixel, the current or the future input pixel, is closer to the output pixel's spatial grid point. This is done by comparing the current and future distance to output values. The polyphase filter is centered on the input pixel that is closer to the output pixel and the new output pixel is created. In order to have a straddle, one of three conditions must be satisfied: 1) no rollover occurs and the current count is less than the alignment count and the next count is greater than or equal to the alignment count; 2) a rollover occurs and the current count is greater than the alignment count and the next count is greater than or equal to the alignment count; or 3) a rollover occurs and both the current and future counts are less than the alignment count. A special case occurs when the count value is exactly the alignment count. When the count value is exactly the alignment count, the polyphase filter is centered on the input pixel and a new output pixel is generated without regard to the straddle rules. An output pixel is generated when either the current count is equal to the alignment count or a straddle occurs.

In the illustrated example, the output and input grids are spatially aligned using the count value. Thus, in the illustrated example, an initial current count value of 64 is assigned. This value is equal to the alignment count value. The future count value is calculated from the scale factor. In this example, the future count value is 16. The future count value is arrived at by incrementing the current count value by L, in this example 80, leading to a count value of 144, which is greater than the M value. Thus to arrive at the future count value a rollover must occur. The rollover subtracts the M value from the future count value, which leads to a future count value of 16. A rollover occurs for input pixel x[0], however, because the current count is equal to the alignment count, 64, the straddle rules do not apply. The polyphase filter is centered on pixel x[0] and creates output pixel y[0]. The input and output pixel counters are incremented by 1.

At pixel x[1], the current count value is 16. The future count value for input pixel x[1] is calculated to be 96. No rollover occurs in this example because the future count does not exceed the M value, 128. However, the current count is less than the alignment count value and the future count value is greater than or equal to the alignment count, thus a straddle occurs. A determination as to whether input pixel x[1] or input pixel x[2] should be used to create output pixel y[1] may be made at this point. The current distance to the next output pixel is derived by taking the absolute value of the current count value minus the alignment count value. In the illustrated example, for input pixel x[1], this distance is 16-64. Taking the absolute value, the current distance to the next output pixel is 48. The future distance to the next output pixel is calculated by taking the absolute value of the future count value minus the alignment count value. In the illustrated example, for input pixel x[2], the distance to the output pixel is 96−64=32. Comparing the two, input pixel x[2] is closer to output pixel y[1] than input pixel x[1]. When an input pixel is not used as a center tap to the polyphase filter, the input pixel counter is incremented but not the output pixel counter. Thus, the polyphase filter is centered on input pixel x[2] and creates output pixel y[1]. Having outputted an output pixel, the output pixel counter is incremented by 1. Additionally, the current and future count values are also calculated for the new input pixel, in this example x[2]. Accordingly, the current count value is 96 and the future count value is 48 for input pixel x[2]. Even though input pixel x[2] was used to create output pixel y[1], a straddle check is made for input pixel x[2]. Here, the future count value has been rolled over so a rollover occurs. However, the future count value is not greater than the alignment count value so no straddle occurs. The input pixel counter is incremented by 1.

At input pixel x[3], the current count value is 48 and the future count value is 128. No rollover occurs, but the current count value is less than the alignment count value and the future count value is greater than or equal to the alignment count value. Thus a straddle occurs. A comparison of the distance to output values is made. Here, the current distance to the next output pixel is 16 and the future distance to the next output pixel is 64. Thus, input pixel x[3] is closer to output pixel y[2] than input pixel x[4]. The polyphase filter is centered on input pixel x[3] and creates output pixel y[2]. The input and output pixel counters are incremented by 1.

At input pixel x[4], the current count value is 128 and the future count value is 80. A rollover occurs at input pixel x[4] and both the current and future count values are greater than the alignment count value so a straddle occurs. The current distance to the next output pixel is 64 and the future distance to the next output pixel is 16. Thus, similar to the situation with respect to input pixel x[1], input pixel x[4] is not used as a center tap to the polyphase filter. The input pixel counter is incremented and the polyphase filter is centered on the next input pixel, x[5], to generate the next output pixel, y[3]. The input and output pixel counters are incremented by 1 and the current and future count values are updated. Similar to the situation with input pixel x[2], a straddle check is made to determine if another output pixel may be generated from centering the polyphase filter on input pixel x[5], but with different filter taps. At input pixel x[5], the current count value is 80 and the future count value is 32. A rollover occurs, but the future count is less than the alignment count value so no straddle occurs. Thus, the input counter is incremented by 1.

At input pixel x[6], the current count value is 32 and the future count value is 112. No rollover occurs. The current count is less than the alignment count value and the future count value is greater or equal to the alignment count value. Thus, a straddle occurs. The current distance to the next output pixel is 32 and the future distance to the next output pixel is 48. Thus, input pixel x[6] is closer to the output pixel y[4] than input pixel x[7]. Hence, the polyphase filter is centered on input pixel x[6] and generates output pixel y[4]. Input and output pixel counters are incremented by 1.

At input pixel x[7], the current count value is 112 and the future count value is 64. A rollover occurs, but the future count value is not greater than the alignment count value. Therefore no straddle occurs. The current count is also not equal to the alignment count. Accordingly, no output pixel is generated by centering the polyphase filter on input pixel x[7]. The input pixel counter is incremented for consideration of the next input pixel. At input pixel x[8], the current count value is 64. This presents a similar situation as with pixel x[0] described above. Any additional input pixels in the input line may be processed according to the method.

FIG. 4b illustrates the counting scheme as applied to a changing array of scale factors. As with interpolation, in decimation each input pixel may be associated with a scale factor. As with using a constant scale factor, the value of M remains constant and preferably at 128. The value of L will vary according to the scale factor.

In this example, at the beginning of the line the input and output pixel counters are initialized to 0. The current value count is initialized so that the input and output grids are aligned. In this example, the current value count is initialized to 64. The future count value is calculated. Input pixel x[0] is associated with a scale factor of 1. The polyphase filter is centered on input pixel x[0] and generates output pixel y[0]. The input and output pixel counters are incremented by 1 and the current and future count values are updated accordingly.

At input pixel x[1], the associated scale factor is 0.95. This corresponds to an L value of 128*0.95=122. The current count is 64 so no straddle occurs. The polyphase filter is centered on input pixel x[1] and generates output pixel y[1]. The input and output pixel counters are incremented by 1. At input pixel x[2], the associated scale factor is 0.9. This corresponds to an L value of 128*0.9=115. The current count value is 58 and the future count value is 45. A rollover occurs, but both the current count and future count values are less than the alignment value so no straddle occurs. Therefore, the polyphase filter is centered on input pixel x[2] and generates output pixel y[2]. The input and output pixel counters are incremented by 1 and the current and future count values are updated accordingly.

At input pixel x[3], the associated scale factor is 0.85. This corresponds to an L value of 128*0.85=109. The current count value is 45 and the future count value is 26. A rollover occurs, but both the current and future count values are less than the alignment value so a straddle occurs. The current distance to the next output pixel is 6 and the future distance to the next output pixel is 19. Thus, input pixel x[3] is closer than input pixel x[4] to output pixel y[3]. The polyphase filter is centered on input pixel x[3] and generates output pixel y[3]. The input and output pixel counters are incremented by 1.

At input pixel x[4], the associated scale factor is 0.8. This corresponds to an L value of 128*0.8=102. The current count value is 26 and the future count value is 128. No rollover occurs, but the current count value is less than the alignment count value and the future count value is greater than or equal to the alignment count value so a straddle occurs. The current distance to the next output pixel is 19 and the future distance to the next output pixel is 38. Thus, input pixel x[4] is closer than input pixel x[5] to output pixel y[4]. The polyphase filter is centered on input pixel x[4] and generates output pixel y[4]. The input and output pixel counters are incremented by 1 and the current and future count values are updated accordingly.

At input pixel x[5], the associated scale factor is 0.75. This corresponds to an L value of 128*0.75=96. The current count value is 128 and the future count value is 80. A rollover occurs and both count values are greater than the alignment count value so a straddle occurs. The current distance to the next output pixel is 64 and the future distance to the next output pixel is 32. Thus, the input pixel x[6] is closer than input pixel x[5] to output pixel y[5]. The input pixel counter is incremented by 1. The polyphase filter is centered on input pixel x[6] to generate output pixel y[5]. The output pixel counter is incremented. Input pixel x[6] is now considered. The current count value is 96 and the future count value is 58. A rollover occurs, but the current count value is greater than the alignment count and the future count value is less than the alignment count value, thus no straddle occurs. A second output pixel is not generated and the input pixel counter is incremented. This method continues at input pixel x[7] and continues until the end of an input line.

FIGS. 5a and 5b illustrate example counting schemes for aspect ratio distortion minimization when using both interpolation and decimation in an input line. FIG. 5a illustrates a transition from decimation to interpolation. When transitioning from decimation to interpolation, the current output pixel may have to be skipped over at the cross-over point. This condition occurs when the previous input pixel and the current input pixel straddle an output pixel. If the previous input pixel created this straddled output pixel, then the skip output flag must be set, since this output has already been created.

In the illustrated example, a constant scale factor of 0.625 (or an L value of 80 and an M value of 128) is used for decimation and a constant scale factor of 1.6 (or an L value of 128 and an M value of 80) is used for interpolation. The transition to interpolation occurs at input pixel x[4]. As with the decimation examples above, input pixels x[0]-x[3] are processed according to the method disclosed with respect to FIGS. 4a and 4b.

In the illustrated example, at input pixel x[4] the associated scale factor changes from less than 1 to greater than 1. Thus, a transition from decimation to interpolation is made. The current count value at x[4] would be 128 after the calculations and incrementing of the input and output pixel counters. However, because input pixels x[3] and x[4] straddle output pixel y[2], the counting method needs to determine if output pixel y[2] has already been generated. For example the pseudo code shown below may be used.

```
Let cc = current count value
Let cp = previous count value
Let hc = current horizontal scale factor
Let hp = previous horizontal scale factor
Let r = roll-over flag (set to one if a roll-over occurs between cc and cp)
Let s = skip output flag
Let dc = current distance to straddled output
Let dp = previous distance to straddled output
dc = cc − 64
dp = 64 − cp
If ((hc > 1) AND (hp ≦ 1))
   If ((cp ≦ 64) AND (cc ≧ 64) AND (dp ≦ dc) AND (r == 0))
      s = 1
   Else
      s = 0
   End
Else
   s = 0
End
```

After determining if an output needs to be skipped, the method of interpolation described with respect to FIGS. 3a and 3b may be used to continue processing the remainder of the input line.

FIG. 5b illustrates a transition from interpolation to decimation. When transitioning between interpolation to decimation, an output pixel may need to be created in a position that would otherwise be skipped over. This condition occurs when the cross-over point lies on the right side of an output position. The figure illustrates this situation.

In the illustrated example, a constant scale factor of 1.6 (or an L value of 128 and an M value of 80) is used for interpolation and a constant scale factor of 0.625 (or an L value of 80 and an M value of 128) is used for interpolation. The transition to decimation occurs at input pixel x[3]. As with the interpolation examples above, input pixels x[0]-x[2] are processed according to the method disclosed with respect to FIGS. 3a and 3b.

In the illustrated example, at input pixel x[3] the associated scale factor changes from greater than 1 to less than 1. Thus, a transition from interpolation to decimation is made. The current count value at x[3] would be 80 after the calculations and incrementing of the input and output pixel counters. The current count value is greater than 64, which indicates that the input pixel is to the right of the relative position of the next output pixel. Thus, an output pixel would need to be generated. For example the pseudo code shown below may be used.

```
Let cc = current count value
Let hc = current horizontal scale factor
Let hp = previous horizontal scale factor
Let f = force output flag
If ((hc ≦ 1) AND (hp > 1))
   If (cc ≧ 64)
      f = 1
   Else
      f = 0
   End
Else
   f = 0
End
```

After determining if an output needs to be forced to be calculated, the method of decimation described with respect to FIGS. 4a and 4b may be used to continue processing of the input line.

FIG. 6 is a flowchart illustrating an example method for aspect ratio distortion minimization. It should be noted that although not explicitly shown a check whether any additional pixels are in the input line is performed and the method ends when there are no more input pixels for the line. Further, it is assumed that counters, including input and output pixel counters and current and future value counters are initialized.

At step 602, the grids for the first input and output pixels are aligned. This ensures that the input and output pixels are in the same location of the image spatially. At step 604, the scale factor is determined for the input pixel location. The scale factor may be obtained from a look-up table or other format. At 606 a determination whether the scale factor is greater or less than 1 is made. If the scale factor is greater than 1, an interpolation method is performed. If the scale factor is less than 1, a decimation method is performed.

If interpolation is performed, step 608 determines whether a transition between decimation to interpolation occurs. This may be accomplished by using a flag that indicates whether the previous input pixel was interpolated or not. Other methods may include comparing the previous pixel's scale factor with the current scale factor. If a transition between decimation to interpolation occurs, the method determines whether it is necessary to skip the next output pixel.

If decimation is performed, step 610 determines whether a transition between interpolation to decimation occurs. This may be accomplished by using a flag that indicates whether the previous input pixel was decimated or not. Other methods may include comparing the previous pixel's scale factor with the current scale factor. If a transition between interpolation to decimation occurs, the method determines whether it is necessary to force calculating an output pixel.

Regardless of whether interpolation or decimation is performed, the input pixel may be processed according to the respective method described with respect to FIGS. 3a, 3b, 4a, and 4b at step 612. The count values are updated at step 614. An output pixel may be generated at step 616. However, in decimation, as described with respect to FIGS. 4a and 4b, an output pixel may not necessarily be generated. Any output pixel generated is outputted at step 618. The method then proceeds back to step 604 for the next input pixel.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for scaling an image input pixel grid having a given aspect ratio to an image output pixel grid having a different aspect ratio, comprising:
   receiving input pixels from a video source;
   determining an input position count value for each input pixel representing a numerical position of that input pixel in relation to the beginning of an input line;
   determining an output position count value for each output pixel representing a numerical position of that output pixel in relation to the beginning of an output line;
   determining an alignment count value for alignments of input pixels on the input pixel grid with output pixels on the output pixel grid;
   determining a position dependent scale factor for each input pixel based on a comparison of input position count values of input pixels, the output position count values of neighboring output pixels, and the alignment count value;
   determining that an output pixel should be outputted based on the count value comparison;
   centering a polyphase finite impulse response filter on a particular input pixel based on the count value comparison;
   generating an output pixel using the polyphase finite response filter on a particular input pixel based on the count value comparison; and
   outputting the output pixels;
   whereby the position dependent scale factors provide output pixels corresponding to input pixels at a unity scale factor at a center of the image output pixel grid, at one of a maximum or minimum scale factor at edges of the image output pixel grid, and at a scale factor increasing or decreasing on a pixel-by-pixel basis from the from unity to one of the maximum or minimum scale factor between the center and the edges.

2. The method of claim 1, further comprising:
   setting an initial count value to spatially align an initial input position with an initial output position.

3. The method of claim 1, wherein the scale factor is derived from dividing an interpolation value by a decimation value.

4. The method of claim 3, wherein the maximum between the interpolation value and decimation value is fixed to be a constant.

5. The method of claim 3, wherein a look-up table is used to determine the interpolation value and decimation value based on the input position.

6. The method of claim 1, further comprising:
   transitioning from decimation to interpolation; and
   determining if the output pixel should not be outputted as a result of the transition from decimation to interpolation.

7. The method of claim 1, further comprising:
   transitioning from interpolation to decimation; and
   determining if an additional output pixel should be generated as a result of the transition from interpolation to decimation.

8. A system, comprising:
   a filter operable to:
     receive input pixels from a video source;
     determine an input position count value for each input pixel representing a numerical position of that input pixel in relation to the beginning of an input line;
     determine an output position count value for each output pixel representing a numerical position of that output pixel in relation to the beginning of an output line;
     determine an alignment count value for alignments of input pixels on the input pixel grid with output pixels on the output pixel grid;
     determine a position dependent scale factor for each input pixel based on a comparison of input position count values of input pixels, the output position count values of neighboring output pixels, and the alignment count value;
     determining whether to output an output pixel based on the count value comparison;
     center a polyphase finite impulse response filter on a particular input pixel based on the count value comparison;
     generate an output pixel using the polyphase finite response filter on a particular input pixel based on the count value comparison; and
   output the output pixels;
   whereby the position dependent scale factors provide output pixels corresponding to input pixels at a unity scale factor at a center of the image output pixel grid, at one of a maximum or minimum scale factor at edges of the image output pixel grid, and at a scale factor increasing or decreasing on a pixel-by-pixel basis from the from unity to one of the maximum or minimum scale factor between the center and the edges.

9. The system of claim 8, wherein the filter is further operable to:
   set an initial count value to spatially align an initial input position with an initial output position.

10. The system of claim 8, wherein the scale factor is derived from dividing an interpolation value by a decimation value.

11. The system of claim 10, wherein the maximum between the interpolation value and decimation value is fixed to be a constant.

12. The system of claim 10, wherein a look-up table is used to determine the interpolation value and decimation value based on the input position.

13. The system of claim 8, wherein the filter is further operable to:
   transition from decimation to interpolation; and
   determine if the output pixel should not be outputted as a result of the transition from decimation to interpolation.

14. The system of claim 8, wherein the filter is further operable to:
   transition from interpolation to decimation; and
   determine if an additional output pixel should be generated as a result of the transition from interpolation to decimation.

15. A system comprising:
   logic encoded in circuitry or on a non-transitory computer readable medium, the logic operable to perform operations comprising:
   receive input pixels from a video source;
   determine an input position count value for each input pixel representing a numerical position of that input pixel in relation to the beginning of an input line;
   determine an output position count value for each output pixel representing a numerical position of that output pixel in relation to the beginning of an output line;
   determine an alignment count value for alignments of input pixels on the input pixel grid with output pixels on the output pixel grid;
   determine a position dependent scale factor for each input pixel based on a comparison of input position count values of input pixels, the output position count values of neighboring output pixels, and the alignment count value;

determining whether to output an output pixel based on the count value comparison;

center a polyphase finite impulse response filter on a particular input pixel based on the count value comparison;

generate an output pixel using the polyphase finite response filter on a particular input pixel based on the count value comparison; and output the output pixels;

whereby the position dependent scale factors provide output pixels corresponding to input pixels at a unity scale factor at a center of the image output pixel grid, at one of a maximum or minimum scale factor at edges of the image output pixel grid, and at a scale factor increasing or decreasing on a pixel-by-pixel basis from the from unity to one of the maximum or minimum scale factor between the center and the edges.

16. The system of claim 15, wherein the logic is further operable to:

set an initial count value to spatially align an initial input position with an initial output position.

17. The system of claim 15, wherein the scale factor is derived from dividing an interpolation value by a decimation value.

18. The system of claim 17, wherein the maximum between the interpolation value and decimation value is fixed to be a constant.

19. The system of claim 17, wherein a look-up table is used to determine the interpolation value and decimation value based on the input position.

20. The system of claim 15, wherein the logic is further operable to:

transition from decimation to interpolation; and determine if the output pixel should not be outputted as a result of the transition from decimation to interpolation.

* * * * *